Sept. 15, 1970   J. B. MEJIA   3,528,463
POWERED SAW
Original Filed Jan. 11, 1965   3 Sheets-Sheet 1
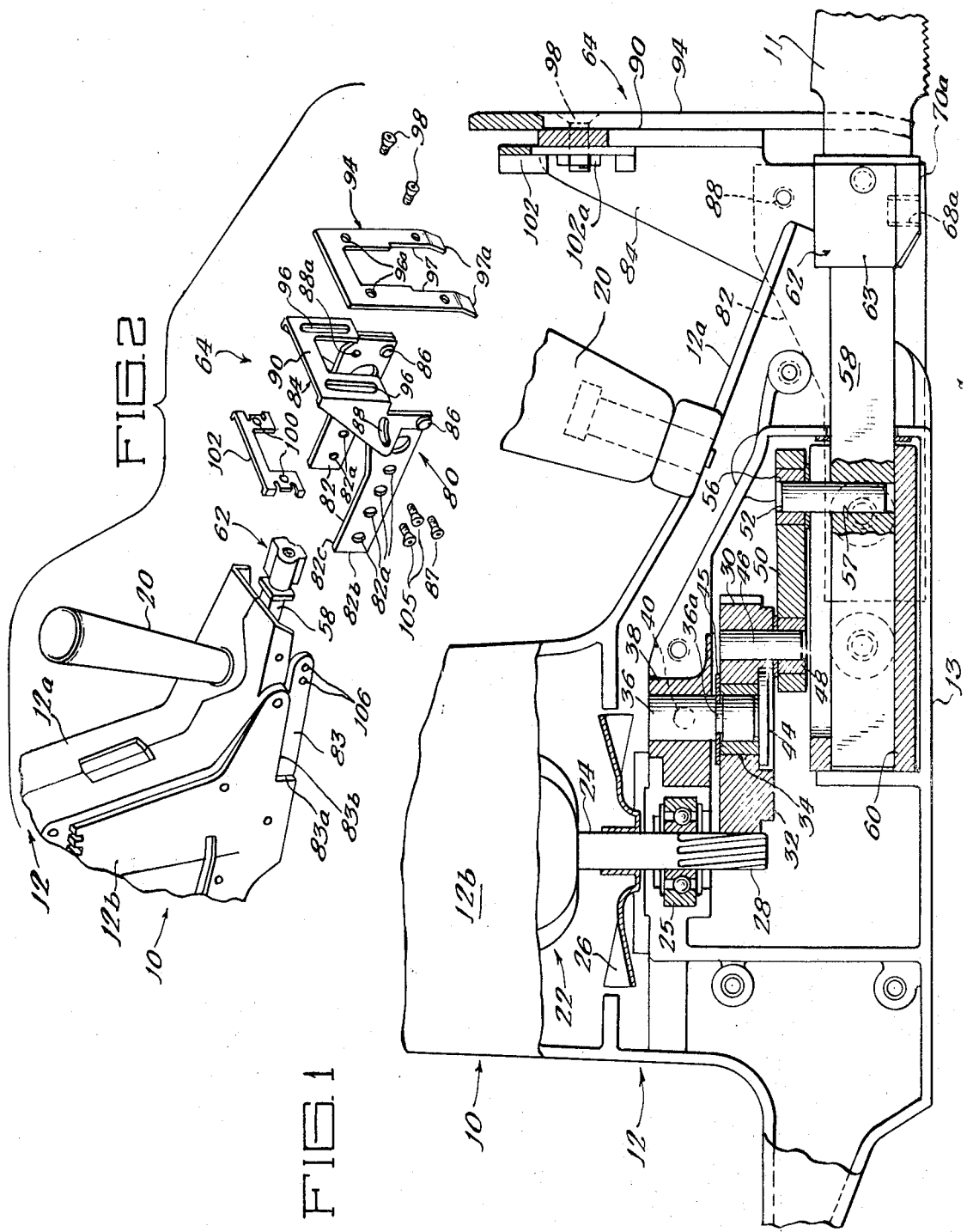
Inventor:
James B. Mejia
By: Hofgren, Wegner, Allen, Stellman & McCord
Attorneys

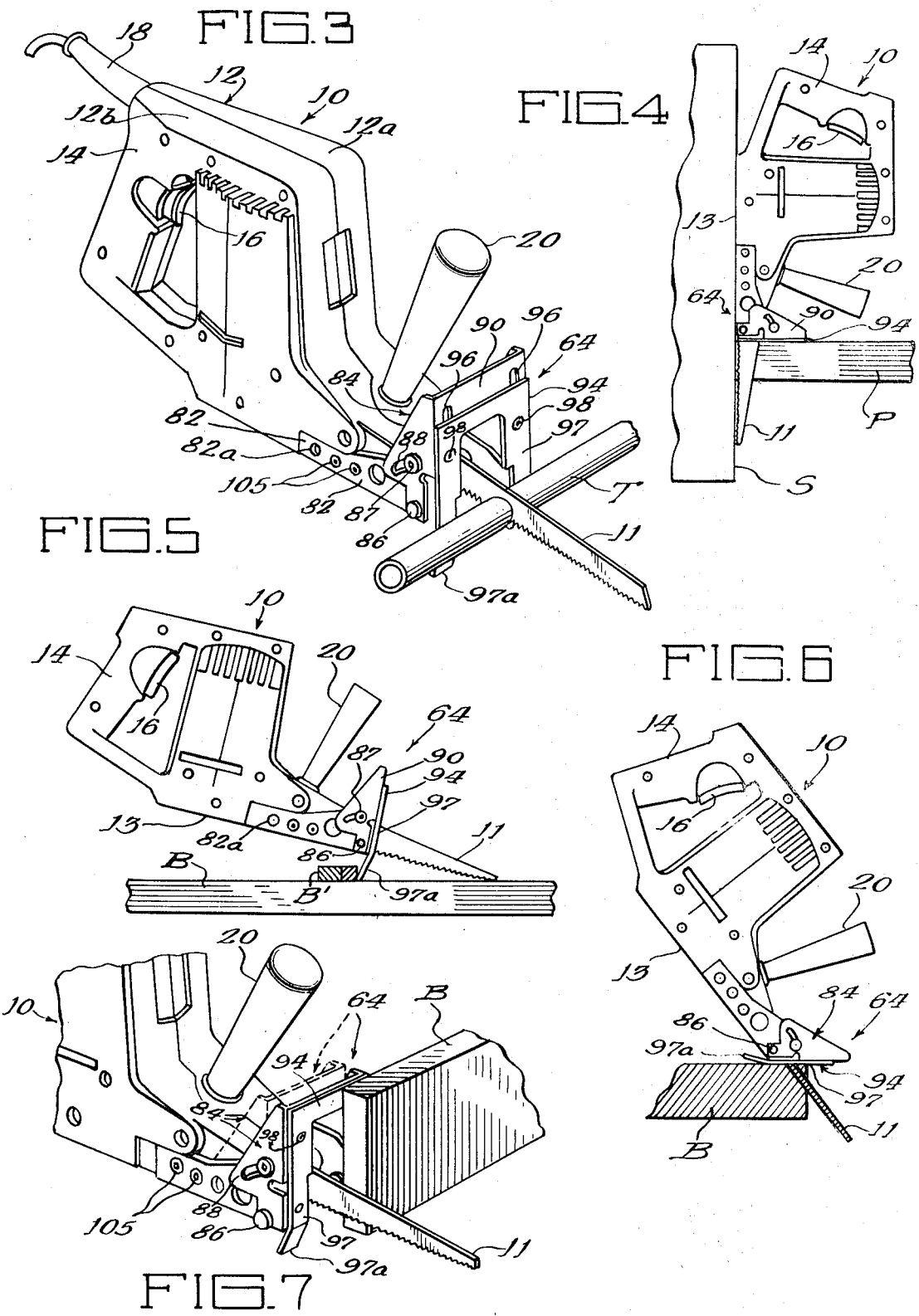

Sept. 15, 1970  J. B. MEJIA  3,528,463
POWERED SAW
Original Filed Jan. 11, 1965  3 Sheets-Sheet 3
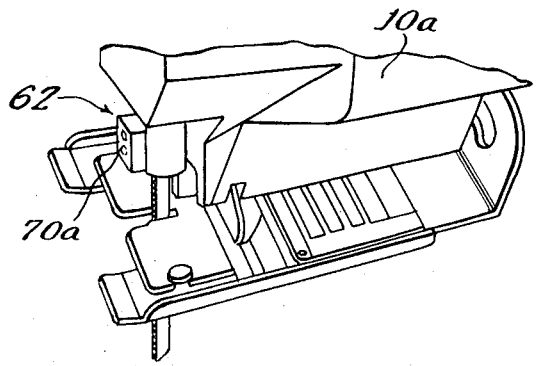
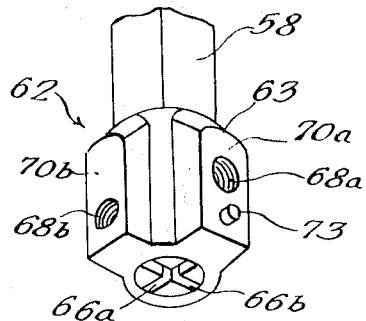
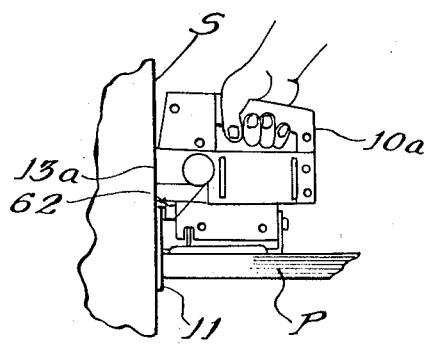
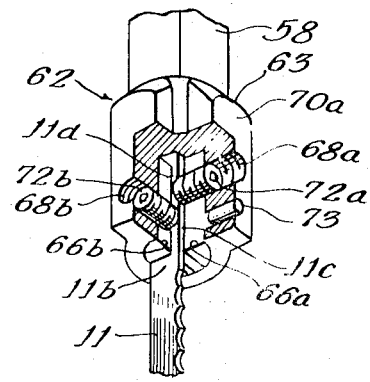
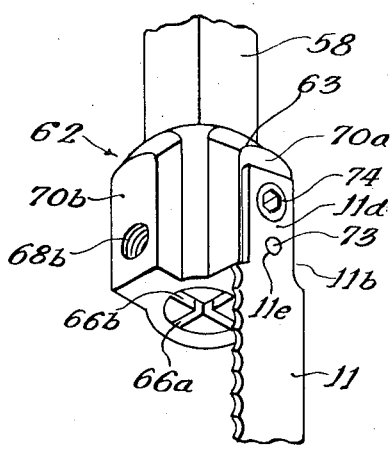
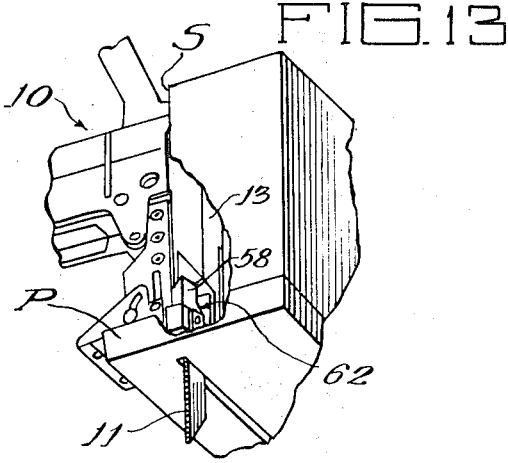

United States Patent Office 3,528,463
Patented Sept. 15, 1970

3,528,463
POWERED SAW
James B. Mejia, Naperville, Ill., assignor to G. W.
Murphy Industries Inc., a corporation of Texas
Original application Jan. 11, 1965, Ser. No. 424,560, now
Patent No. 3,360,021. Divided and this application
Sept. 22, 1967, Ser. No. 669,872
Int. Cl. B27b *11/06*
U.S. Cl. 143—68                      3 Claims

ABSTRACT OF THE DISCLOSURE

A portable electric hand saw is provided with a housing and a reciprocating drive mechanism for driving a saw blade plunger. Mounted on the end of the plunger is a saw blade connector which is designed with a plurality of differently oriented openings such that when a saw blade is positioned in a selected one of the openings and connected therein, the orientation of the saw blade will be such as to secure maximum usage of the saw for the intended purpose.

---

This application is a divisional application of my co-pending application Ser. No. 424,560, filed Jan. 11, 1965, Pat. No. 3,360,021 and entitled Powered Saw.

The application relates to powered saws and more particularly to a new and improved powered saw of the reciprocating blade type.

Powered saws of the reciprocating blade type, frequently referred to as "saber saws," have enjoyed a great deal of popularity among carpenters, builders, home handymen, and the like. However, with the saber type of saw, it has previously been impossible to position the saw such that the saw could cut "flush" with an upstanding wall surface. In other words, if it were desired to remove a structure which extended transversely outwardly from a face of a surface such as a wall or the like, it was impossible to position the saw and blade so that the outwardly projecting structure would be cut off along a line flush with the surface so that no material projected outwardly therefrom. Also, in hitherto known saber saws, it has not been possible to position the saw blade so the cutting edge thereof lies in a plane generally perpendicular to, as well as generally parallel to, the longitudinal extent of the saw so that the saw could cut "left" or "right" as well as in a forward-rearward direction. Furthermore, because of the need for translating rotary motion into reciprocating motion of the blade, former saber saw structures have had to incorporate interconnecting drive system which utilized a multiplicity of parts. Finally, a limitation of the previously known saber saws was that, because the cutting action is done as part of a reciprocatory movement and the work is positioned by a fixed shoe, it was possible for a small portion of the blade to wear out, rendering the blade useless, even though the remainder of the blade remained relatively sharp.

Thus it is a general object of this invention to provide a new and improved powered reciprocating saw.

It is a primary object of this invention to provide a new and improved powered reciprocating saw of the saber saw type which has fewer parts, may be adapted to a greater number of sawing situations, and is provided with structure which promotes the longevity of saw blade life.

A more detailed object is to provide a new and improved powered saw of the reciprocating type wherein a saw is provided with a shoe structure which is adjustable relative to the housing and saw blade so that different portions of the blade may be exposed to wear to increase blade life.

Another object of this invention is to provide a new and improved powered saw of the reciprocating type wherein the rotary movement of the motor is translated into reciprocating movement of the saw blade by means of one intermediate rotating member which is provided with means for driving an interconnecting link between the rotating member and the saw blade holder.

Yet another more detailed object of this invention is to provide a new and improved powered saw of the reciprocating blade type wherein the saw is provided with a novel and unique saw blade holder which permits the blade to be connected to the saw so that the cutting edge thereof extends lengthwise of the saw or generally transverse thereto and which further permits the saw blade to be connected to the saw to adapt the saw for cutting projections from a planar surface "flush" with respect to such planar surfaces.

Other objects, features and advantages of the present invention will be apparent from the following description of the preferred embodiments illustrated in the accompanying drawings, in which:

FIG. 1 is a longitudinal section view of a portion of the powered saw of this invention showing the drive system thereof;

FIG. 2 is an exploded view showing the novel shoe and its mounting arrangement relative to the saw;

FIG. 3 is a perspective view of a saw embodying the features of this invention showing the several components of the saw in assembled relation;

FIG. 4 is a side elevational view showing one of the cutting positions possible with the saw of this invention;

FIG. 5 is a side elevational view showing another cutting position possible with the saw of this invention;

FIG. 6 is a side elevational view illustrating yet another cutting position;

FIG. 7 is a fragmentary perspective view showing the adjustability of the shoe relative to the saw which permits different portions of the length of the saw blade to be exposed to wear;

FIG. 8 is a perspective view of a reciprocating powered saw utilizing the novel saw blade connector means of this invention;

FIG. 9 is a side elevational view of the reciprocating saw shown in FIG. 8 utilizing the connector of this invention with the saw blade mounted for flush cutting;

FIG. 10 is an enlarged fragmentary view of the saw blade connector of this invention;

FIG. 11 is a view similar to FIG. 10, partially broken away to illustrate the manner of securing a saw blade to the connector;

FIG. 12 is a view similar to FIG. 10 illustrating the means for securing a saw blade to the connector for flush cutting; and FIG. 13 is an illustration of the connector of this invention in use with the saw illustrated in FIGS. 1–7 with the saw blade mounted for flush cutting.

The invention is directed, in brief, to the provision of a connector for saw blades which permits the blade to be secured to the saw in such a manner that its cutting edge is either aligned with the longitudinal extent of the saw or substantially perpendicular thereto. Also, the connector is adapted to position the blade generally transverse to the length of the saw in a plane which is at least coextensive with the outermost extent of the saw to permit the saw to cut projections from planar surfaces flush with said planar surfaces. In conjunction with this, the novel shoe utilized with the saw of this invention permits adjustment of the shoe in several positions both longitudinally of the blade, angularly of the blade and perpendicularly of the blade to enhance blade life and adapt the blade for use in a number of positions, one of which is to permit the accomplishment of flush cutting when the blade is mounted on the connector for such purposes. Finally the drive means of the saw of this invention incorporates but a single gear driven by a rotating shaft of the motor, which gear is provided with an eccentric pin thereon connected to the linkage which is connected to the saw blade plunger so that rotation of the motor shaft and rotation of the gear is translated ino reciprocating movement of the saw blade.

Referring now to the drawings, the saw 10 of this invention is provided with a saw blade 11 and includes a housing 12 comprising two half covers 12a and 12b. Blade 11 is reciprocally driven for cutting a work piece such as tube T as shown in FIG. 3, or a board B as shown in FIGS. 5–7. The housing may be so formed as to provide a flat base 13 (for a purpose to be described later) and primary handle portion 14 in which there may be located a finger switch 16 for actuating the device when the cord 18 has been connected with a source of electrical power. Additionally, a second handle 20 may be provided for aiding in the guiding of the saw.

Typically, the saw is provided with a source of power, such as an electric motor 22 which rotates a shaft 24 mounted in a bearing 25. A fan 26 may be affixed to the shaft to cool the motor as the shaft rotates. At its lower end, the shaft is provided with gear teeth 28 for meshing with gear teeth 30 of intermediate gear 32. The gear 32 is provided with a bearing insert 34 for rotatably mounting the gear about a gear shaft 36. Gear shaft 36 is held in a semicircular recess 38 which is formed as a part of the housing 12a when the housing is cast to position shaft 36 generally parallel to, but spaced from, shaft 24. A set screw 40 is threaded through the shank of the shaft 36 for holding the shaft in the recess 38.

The lower end of the shaft 36 is provided with an enlarged cap-like end 44 which rests against the bearing insert 34 and holds the gear in its position for rotation about the shaft 36. The shaft also has a reduced portion 36a which supports a washer 45 to maintain the gear 32 properly positioned at the lower end of shaft 36.

The gear 32 is provided with a driving pin 46 which projects outwardly from the lower face of the gear at a point which is eccentric to the axis of rotation of the gear. Pin 46 is received in a bearing insert 48 which is mounted in the translating link 50. At the other end of the translating link, a second pin 52 projects outwardly from the bearing insert 56 and is received in an opening 57 in plunger 58.

The plunger 58 is mounted in the housing for slidable movement in a bearing or guide 60. The guide 60 encases the plunger within bearing surfaces to prevent any movement of the plunger relative to the saw other than an in and out or reciprocatory movement. As the shaft 24 rotates and rotates the gear 32, the pin 46 will revolve about the axis of rotation of the gear 32 (which is the same as the shaft 36). Since the plunger 58 is mounted in the guide 60 only for linear slidable movement relative to the housing, the pivotal mounting of the pins 46 and 52 in the link 50 will transform the rotational movement of the shaft 24, gear 32 and pin 46 into reciprocating movement of the plunger 58.

The distal or free end of the plunger 58 is provided with saw blade connector 62 of this invention. When the blade 11 is attached to the connector, it projects outwardly through the shoe assembly 64 and reciprocation of the plunger 58 will produce the reciprocatory sawing action of the blade.

The saw blade connector 62 of this invention comprises an enlarged end 63 of the plunger 58 and includes two slots 66a and 66b which intersect each other at right angles along a line generally coincident with the longitudinal axis of the plunger. These slots extend longitudinally of the interior of the plunger with one slot generally parallel to or aligned with a plane which longitudinally bisects the saw and the other slot generally perpendicular to such a plane. The slots are of a sufficient width and length to receive the saw blade shank 11a. The connector is further provided with threaded taps 68a and 68b which are formed in each one of the slots 66a and 66b, respectively, and extend outwardly substantially at right angles to the longitudinal axis of the plunger through the flat faces 70a and 70b of the connector portion. Screws, such as headless screws 72a and 72b, may be threaded into the taps 66a and 66b so that one screw such as 72a will engage the edge 11c of the saw blade shank and the other screw, such as 72b, will engage the face 11d of the saw blade shank to firmly and securely hold the blade in the connector. It can be readily seen that whether the blade is positioned as shown in FIG. 11 in slot 66a, or positioned in slot 66b, the slot will closely embrace the blade shank and in either position one of the screws will be in a position to engage the edge 11c of the saw blade and the other screw will be in a position to engage the flat face 11d of the shank to firmly and securely hold the blade in the connector. Thus the connector of this invention provides a means for mounting a saw blade in such a fashion as to position the blade so that the cutting teeth thereof may lie in a plane generally coextensive with the longitudinal extent of the saw, or in a plane generally transverse to the longitudinal extent of the saw.

As further illustrated in FIG. 12, the connector 62 is further provided with means which permit the saw blade to be mounted on the connector in such a manner as to adapt the saw for "flush" cutting. By "flush" cutting is meant the ability to cut projections P from a planar surface S in a plane which is flush with the surface so that no material projects outwardly from the planar surface from which the projection is cut. This means includes a stub 73 which projects outwardly from one of the flat faces 70a of the connector, a flat headed screw 74 and the flat face 70a itself. A saw blade having an opening 11e in the shank thereof may be placed against the face 70a so that the stub 73 is inserted into the opening 11e in the shank of the blade. The blade may also be provided with a second countersunk opening (not shown) through which the flat headed screw 74 may extend for threaded engagement with the tap 68a. As shown in greatest detail in FIG. 12 and illustrated in FIGS. 13 and 14, this mounts the saw blade 11 for cutting in a direction generally perpendicular to the longitudinal extent of the saw at the most forward point of the saw to permit the blade to be positioned flush against a planar surface from which a projecting structure is to be cut. Of course, portions of the housing of the saws 10 and 10a are so constructed that they do not project outwardly beyond the plane of the saw blade when the blade is mounted on face 70a of the connector for flush cutting. In fact, the housings may be so formed so that the flat bases 13 and 13a of the saws 10 and 10a, respectively, operate as a guide for flush cutting, as shown in FIGS. 9 and 13.

Another feature of this invention which also facilitates the flush cutting feature of the invention is the adjustability of the shoe assembly on the saw. The relative features of the shoe assembly are best shown in FIGS. 2–7. The inventive features of the shoe assembly are the provision of a shoe assembly for a reciprocating saw which is adjustable relative to the length of the saw blade to expose different portions of the saw blade for use, a guide portion which is angularly adjustable in a plane transverse to the length of the blade, and a shoe plate on the guide assembly which is adjustable in the plane of the guide assembly, whatever the angular disposition of the guide assembly relative to the length of the blade, so that portions of the shoe plate may extend beyond the line of the saw teeth or so that none of the portions of the shoe plate project outwardly beyond the plane of a saw blade mounted on the flat face 70a of the connector to permit the saw to be used for flush cutting when the blade is appropriately fastened on the connector for that purpose.

The shoe assembly includes a generally U-shaped bracket 80 having two spaced parallel ribs or rails 82 with opening 82a therein. The rails 82 embrace the forward portion of the saw 10 in the area of two indentations 83 formed on either side of the front portion of the saw near the bottom edge thereof. The indentation 83 forms two shoulders 83a and 83b which serve as stop means to assist in positioning and holding the rails 82 relative to the housing 12, by abutting the rail ends and rail top edges 82b and 82c, respectively.

The two ribs or rails 82 are joined by a bridge 84 which is pivoted to each rib, such as at 86,, to permit the bridge 84 to be moved angularly with respect to the ribs 82 and therefore the saw 10. The bridge 84 is provided with arcuate slots 88 for receiving fastening means, such as screws 87 which are also threaded through openings 88a in the ribs 82 to lock the bridge in different positions of angular adjustment respective to the ribs.

The bridge has a flat mounting or guide face 90 to which shoe plate 94 is secured. Shoe plate 94 is a generally U-shaped member having two spaced generally parallel legs 97 which terminate in bent free end portions 97a. The bridge face 90 has spaced parallel upright slots 96 and the shoe plate 94 is provided with openings 96a for the reception of screws 98 which are slidable in the slots 96 and threadably received in openings 100 in the nut plate 102 which is positioned on the opposite side of the face 90 or in a nut 102a at the rear of the openings 102. Thus by loosening the screws 98, the shoe plate 94 may be moved relative to the bridge 84 and, therefore, the saw blade itself, and the shoe may be secured in any selected adjusted position by tightening the screws.

When mounted on bridge 84, the legs 97 of shoe plate 94 straddle the saw blade 11. By adjusting the shoe plate relative to the bridge in the described manner, the legs may be positioned so that the free ends extend beyond the base 13 or so that they are above the base as shown in FIGS. 1 and 4. When the shoe plate is in the latter position, with the saw blade attached to connector face 70a as shown in FIG. 12, the saw is adapted for "flush" cutting as shown in FIGS. 9 and 13.

The attachment of the components of the shoe assembly as well as the means by which the shoe assembly is attached to the housing adapts the saw for a variety of other sawing functions as shown in FIGS. 3 through 7. In FIG. 3, the saw is shown in a typical sawing function. The work piece (in this instance the tube T) is positioned in front of the saw and the piece is about to be sawed into two separate sections. For this function, the bridge is positioned substantially upright relative to the blade and the shoe plate is positioned so that the legs project below the plane of the base. The reciprocation of the blade, responsive to the drive means, produces a cutting action through the work piece, tube T.

In FIG. 4, the shoe components are positioned similar to that shown in FIG. 3 with the exception that the shoe plate 94 is positioned as shown in FIG. 1 so that the free ends 97a of the legs 97 do not project beyond the base 13. This permits the saw to make a longitudinal cut in a projection P to a point generally flush with the relative upright planar surface S.

With the shoe plate positioned as shown in FIGS. 3 and 5, so that the bent ends 97a project below the base 13, the saw is adjusted for a plunge cut. To assist in this function, a small block B may be nailed to the board B. With the free ends 97a abutting the block B, the saw may be actuated and tilted downwardly until the blade contacts the board. Continued tilting permits the blade to cut through the board. From that point, the desired cutting function may be accomplished.

In FIG. 6, the shoe components are shown positioned for cutting a beveled edge from a board. Here the bridge 84 is angled relative to the saw blade 11, and the shoe plate 94 is positioned in facial juxtaposition with a board B. With the saw actuated, the edge cut of the board may be made by drawing the saw across the board as shown in FIG. 6.

The connection of the shoe assembly to the saw housing provides a means for adjusting the assembly relative to the saw blade to permit different portions of the blade edge to be exposed to cutting action and therefore to wear. In the preferred embodiment, this means includes the holes 82a formed in the rails, fastening means such as screws 105, and openings 106 formed in the indented portion 83 of the housing near the forward end thereof. By threading the screws through selected openings 82a in the shoe assembly and into openings 106, the assembly may be adjusted lengthwise of the blade, depending upon whether the forwardmost or rearwardmost openings 82a are utilized. The effect of this is shown in FIG. 7 wherein the dotted outline position of the shoe assembly 64 indicates the rearmost point to which the shoe assembly may be moved relative to the blade and the full outline view illustrates a forward adjusted position of the shoe. Since the work piece, such as board B, is held against the face of shoe plate 94, and since the blade is reciprocated between relatively close positions, the position of the shoe plate 94 relative to the length of the blade 11 determines that limited portion of the saw blade which will perform the cutting action and therefore exposed to wear. Adjustment of the shoe assembly relative to the housing determines the position of the shoe plate 94 relative to the length of the blade and provides a means for subjecting different portions of the saw blade to cutting action. In the shoe assembly shown in FIG. 2, the rails 82 are provided with four openings 82a, while in FIGS. 3–7, three such openings are shown. It is to be understood that by lengthening the rails 82 and indentations 83 and providing an extra opening 82a, the shoe assembly may be adjusted so that the shoe plate 97 is positioned a greater distance forward of the housing than with the shorter rails shown in FIGS. 3–7.

The saw of this invention provide a means for reciprocating the saw blade through the use of a simplified drive system which incorporates only the single gear in engagement with the rotating shaft and a single interconnecting link member operably connecting the gear to the plunger. The connector portion of the plunger is provided with unique structure permitting the blade to be positioned for cutting in planes transverse as well as coextensive with the longitudinal extent of the saw and for further permitting the saw to be used for flush cutting as explained. Finally, the novel shoe structure provides a means for exposing different portions of the blade to wear as well as for permitting a variety of cutting functions to be performed by the saw, including "flush" cutting. Thus this invention provides a powered saw of simplified structure and extreme versatility having means for increasing the useful life of a saw blade used therewith.

The foregoing detailed description has been given for clearness of understanding only, and no unnecessary limitations should be understood therefrom, as some modifications may be obvious to those skilled in the art.

I claim:

1. In a hand saw having a housing and a reciprocating drive in said housing for driving a saw blade plunger, a saw blade connector formed on the free end of the plunger adjacent one end of the housing and accessible from outside of the housing for connection thereto of one end of an elongate saw blade, said connector comprising: a plurality of slots formed at the free end of the plunger and opening to the exterior, said slots formed generally transversely to each other and of a size and shape to generally embrace a saw blade shank; and fastening means in the connector in the plane of each slot communicating to the exterior of the connector for securing the shank of a saw blade inserted into one of said slots and thereby fastening the blade to the connector for reciprocation therewith, and said plunger having an outer flat surface at the free end thereof for receiving the shank of a saw blade with fastening means thereon to hold the saw blade to said outer surface at least co-planar with the outermost projection of the saw.

2. In a hand saw having a housing and a reciprocating drive in said housing for driving a saw blade plunger, a saw blade connector formed on the free end of the plunger adjacent one end of the housing and accessible from outside of the housing for connection thereto of one end of an elongate saw blade, said connector comprising: a plurality of slots formed at the free end of the plunger and opening to the exterior, said slots formed generally transversely to each other and of a size and shape to generally embrace a saw blade shank; and fastening means in the connector in the plane of each slot communicating to the exterior of the connector for securing the shank of a saw blade inserted into one of said slots and thereby fastening the blade to the connector for reciprocation therewith; said slots intersect each other and said fastening means include screws threaded in taps formed in the slots, and wherein the taps open to the exterior so that the screws may be threaded to the interior of the connector to a point where they bear against opposed surfaces of the saw blade shank to firmly secure the shank in the connector; said plunger is provided with an outermost flat side surface for receiving the shank of a saw blade and for holding the blade in an outermost plane of the saw, said outermost flat side surface having one of said threaded taps formed therein and a small pin projecting outwardly from the surface thereof, said pin adapted to impale a mating opening formed in the saw blade shank and said threaded tap adapted to receive a mating fastener passed through another opening in the saw blade shank to secure a saw blade to the connector and thereby adapt the saw for flush cutting.

3. The saw blade connector of claim 2 wherein there are two slots which cross each other generally at right angles to each other and wherein the taps are formed generally at right angles to each other so that when the saw blade shank is inserted in one of the slots, the screw in the one slot may be threaded to a point where it engages the edge of the saw blade shank and the screw in the other slot may be threaded in the tap to a point where it engages the face of the saw blade shank to firmly secure the saw blade in the connector.

References Cited

UNITED STATES PATENTS

| 2,735,685 | 2/1956 | Karr | 143—156 X |
| 3,186,726 | 6/1965 | Wilhelm et al. | 143—156 X |
| 3,028,890 | 4/1962 | Atkinson et al. | 143—156 |

FOREIGN PATENTS 923,757  9/1956  Germany.

DONALD R. SCHRAN, Primary Examiner

U.S. Cl. X.R.

143—156; 279—83